US008807669B2

(12) United States Patent
McPhail et al.

(10) Patent No.: US 8,807,669 B2
(45) Date of Patent: Aug. 19, 2014

(54) APPARATUS AND METHOD FOR PROTECTING AXLES FROM WINDING DEBRIS

(75) Inventors: James D. McPhail, Peoria, IL (US); Michael Hans Hinrichsen, Congerville, IL (US); Randy E. Schoepke, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 409 days.

(21) Appl. No.: 13/050,051

(22) Filed: Mar. 17, 2011

(65) Prior Publication Data

US 2011/0227398 A1   Sep. 22, 2011

Related U.S. Application Data

(60) Provisional application No. 61/315,487, filed on Mar. 19, 2010, provisional application No. 61/315,896, filed on Mar. 19, 2010.

(51) Int. Cl.
*B60B 15/02* (2006.01)
*B62D 55/088* (2006.01)
*B60S 1/68* (2006.01)

(52) U.S. Cl.
CPC *B62D 55/088* (2013.01); *B60S 1/68* (2013.01)
USPC ............ 305/107; 301/43; 301/44.3; 305/100; 404/124

(58) Field of Classification Search
CPC .............................. B62D 55/088; B60S 1/68
USPC ......... 301/43, 44.3, 44.4, 44.1; 305/100, 107, 305/110, 115, 109; 404/124, 129, 121, 128, 404/122; 172/508, 554
See application file for complete search history.

(56) References Cited

U.S. PATENT DOCUMENTS 1,423,519 A * 7/1922 Farkas ......................... 301/44.3
1,856,320 A * 5/1932 Clell ............................... 301/43
(Continued)

FOREIGN PATENT DOCUMENTS

DE         2236607        2/1974
EP         08756229 A2    4/1998
(Continued)

OTHER PUBLICATIONS

Record of Negotiations requested by the Expert Board in relation to Russian Application No. 2010502710/49 dated Jun. 22, 2011.
(Continued)

*Primary Examiner* — James English
(74) *Attorney, Agent, or Firm* — Miller, Matthias & Hull

(57) ABSTRACT

An apparatus and method for preventing debris from accessing and wrapping around the axles of a vehicle, such as a landfill compactor, are disclosed. The apparatus may include a wheel having a rim from which radially extend a plurality of cleats or tips. A subset of tips may be provided circumferentially around a laterally inner edge of the wheel. A wheel guard may be mounted between adjacent pairs of tips of the subset. Each wheel guard may be welded to the rim and to the adjacent pairs of tips. Each wheel guard may be a unitary piece of metal, or could be provided in two or more segment so as to be adjustable and thus facilitate use on wheels of differing diameters, or with different tip spacing. The wheel guards and adjacent tips form a continuous barrier around the circumference of the wheel to prevent debris from accessing and wrapping around the axles of the compactor.

20 Claims, 10 Drawing Sheets

(56) References Cited

U.S. PATENT DOCUMENTS

| | | | |
|---|---|---|---|
| 3,922,106 A * | 11/1975 | Caron et al. | 404/121 |
| 4,919,566 A * | 4/1990 | Caron et al. | 404/121 |
| 5,429,429 A * | 7/1995 | Loegering et al. | 305/193 |
| 5,687,799 A | 11/1997 | Greenfield et al. | |
| 5,769,507 A | 6/1998 | Brockway | |
| 5,951,123 A | 9/1999 | Bomstad et al. | |
| 5,967,242 A | 10/1999 | Caron et al. | |
| 6,273,516 B1 | 8/2001 | Brockway | |
| 6,322,170 B1 | 11/2001 | Knell et al. | |
| 6,631,961 B1 * | 10/2003 | Bedford et al. | 305/136 |
| 6,991,401 B1 | 1/2006 | Caron | |
| D593,473 S | 6/2009 | Fournier et al. | |
| 7,562,517 B1 * | 7/2009 | Kornecki | 56/504 |
| 8,007,200 B2 * | 8/2011 | Brockway | 404/124 |
| D654,513 S | 2/2012 | McPhail | |
| 8,523,291 B2 * | 9/2013 | Urgu | 301/43 |
| 2004/0012244 A1 | 1/2004 | Waterman et al. | |
| 2006/0244311 A1 | 11/2006 | Brockway | |
| 2007/0280783 A1 | 12/2007 | Gibbins et al. | |
| 2012/0213586 A1 * | 8/2012 | Ugru | 404/121 |

FOREIGN PATENT DOCUMENTS

| | | | |
|---|---|---|---|
| EP | 875629 | | 11/1998 |
| JP | 2001095334 A | * | 4/2001 |
| JP | 2001187501 A | * | 7/2001 |

OTHER PUBLICATIONS

Declaration of Hans-Hermann Habenicht signed Jan. 18, 2010; 8 pages.
Hanomag Compaktor CL240, Exhibit A to Habenicht Declaration, Jan. 1994; 8 pages.
Hanomag Compaktor CL240—English translation, 9 pages.
Komatsu Hanomag Parts Book CL310, Exhibit B to Habenicht Declaration, Apr. 1994; 8 pages.
Hanomag brochure, Apr. 1994; 20 pages.
Hanomag Compaktor CL240, Mar. 1995, 3 pages.
Hanomag Compaktor CL66, Nov. 1990, 6 pages.
Hanomag Compaktor CD 230, Jan. 1994, 8 pages.
Hanomag Compaktor CD 230—English translation, 8 pages.
Hanomag Compaktor CL290, Jun. 1991, 8 pages.
Hanomag brochure, Jun. 1990, 16 pages.
Hanomag CL290 Parts Book, Dec. 1991, 6 pages.
Hanomag CL240 photograph, no date, 1 page.
Hanomag brochure, May 1994, 18 pages.
The Caron Wire Safeguard Group brochure, no date, 1 page.
Hanomag Compaktor C 55 D, no date, 6 pages.
Hanomag Compaktor CL280, no date, 8 pages.
Hanomag Compaktor CL 310, Mar. 1994, 8 pages.
Junior Party Greenfield's List of Proposed Motions filed in Patent Interference No. 105,806, 4 pages.
Senior Party Brockway's List of Proposed Motions filed in Patent Interference No. 105,806, 6 pages.
Junior Party Greenfield's Response to Order filed in Patent Interference No. 105,806, 4 pages.
Senior Party Brockway's Proposed Unpatentability Motion filed in Patent Interference No. 105,806, 4 pages.
Senior Party Brockway's Substantive Motion 1 filed in Patent Interference No. 105,806, 51 pages.
Senior Party Brockway's Substantive Motion 2 filed in Patent Interference No. 105,806, 20 pages.
Declaration of Interference filed in Patent Interference No. 105,806, 48 pages.
Board Order—Motion Times issued in Patent Interference No. 105,806, 8 pages.
Greenfield Response to Order filed in Patent Interference No. 105,806, 4 pages.
Board Order issued in Patent Interference No. 105,806, 3 pages.
Brockway Request for Rehearing filed in Patent Interference No. 105,806, 10 pages.
Brockway Exhibit List filed in Patent Interference No. 105,806, 3 pages.
Decision—Brockway Request for Rehearing issued in Patent Interference No. 105,806, 6 pages.
Brockway Response to Board Order filed in Patent Interference No. 105,806, 3 pages.
Greenfield Request for Adverse Judgment filed in Patent Interference No. 105,806, 3 pages.
Board Order—Miscellaneous issued in Patent Interference No. 105,806, 3 pages.
Greenfield Response to Miscellaneous Order filed in Patent Interference No. 105,806, 3 pages.
Board Order Vacating Times issued in Patent Interference No. 105,806, 2 pages.

* cited by examiner

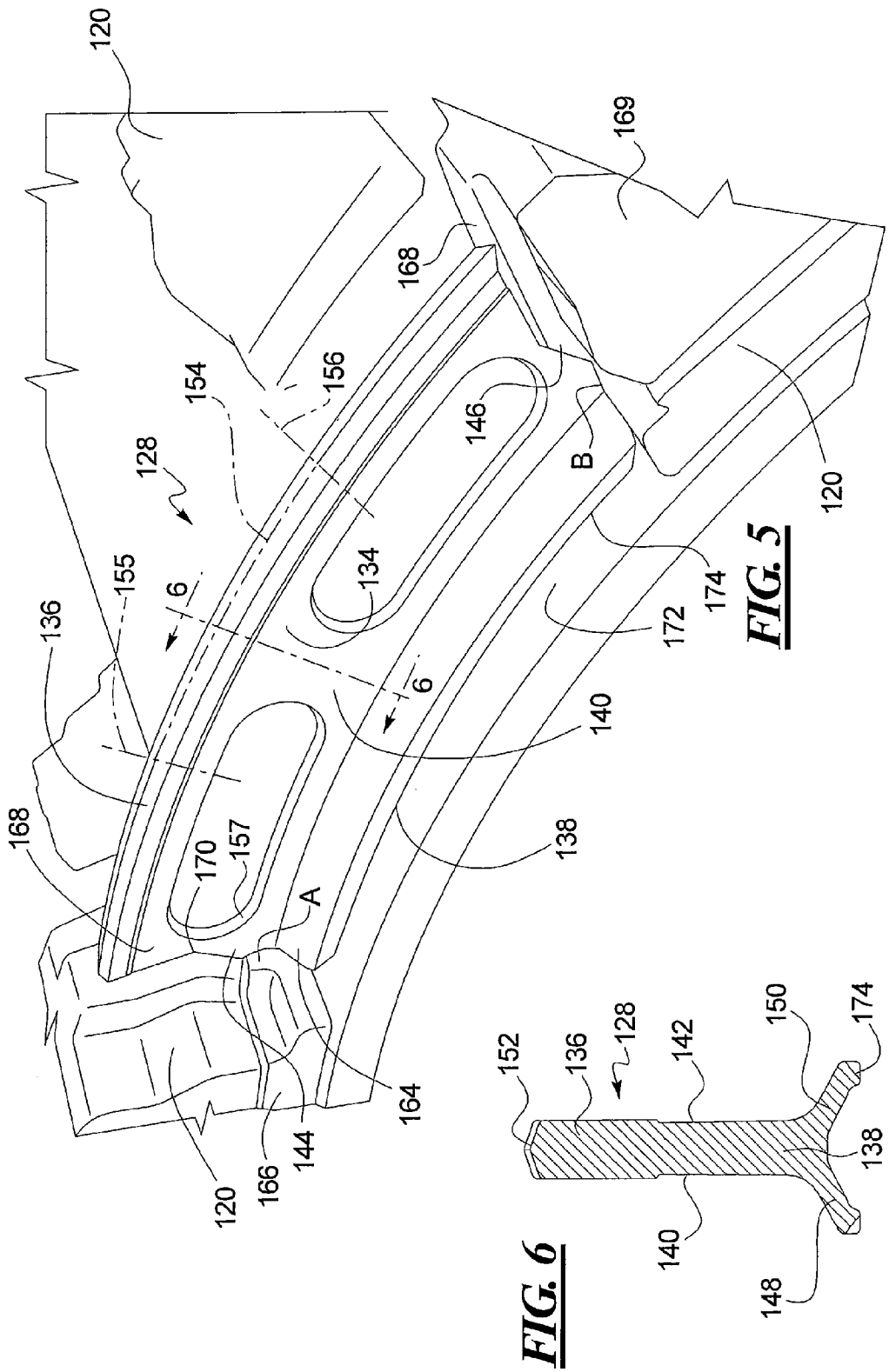

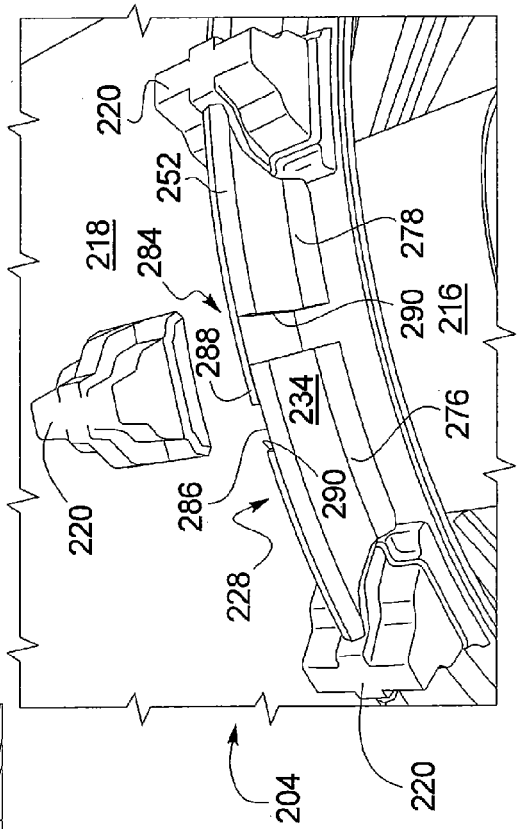

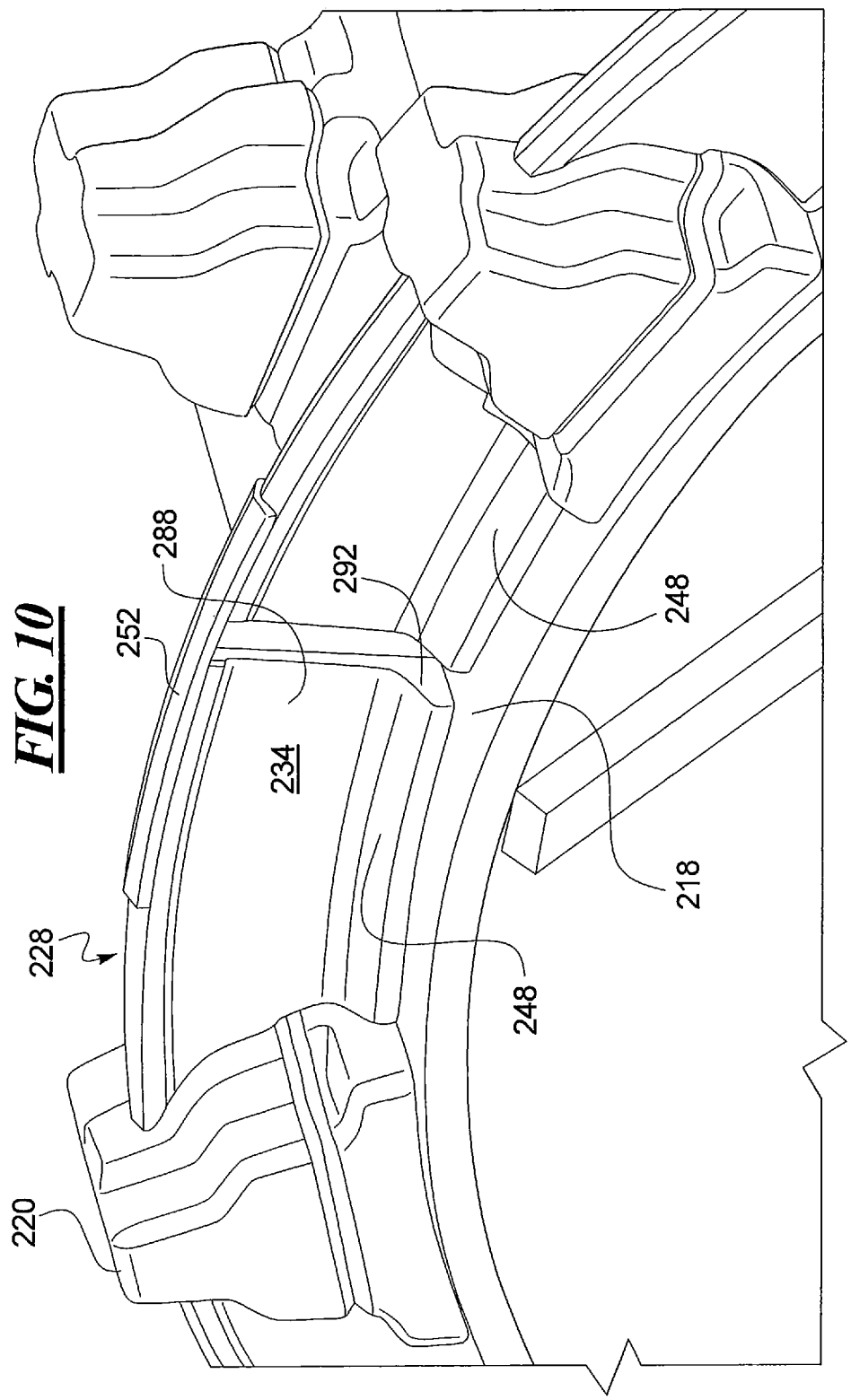

APPARATUS AND METHOD FOR PROTECTING AXLES FROM WINDING DEBRIS

CROSS-REFERENCE TO RELATED APPLICATION

This is a non-provisional application claiming priority under 35 USC §119 (e) to U.S. Provisional Patent Application Nos. 61/315,487 and 61/315,896, both filed on Mar. 19, 2010.

TECHNICAL FIELD

The present disclosure generally relates to compactor wheels and, more particularly, relates to guards for preventing debris from accessing and winding around axles supporting such wheels.

BACKGROUND

With certain vehicles, it is important to prevent debris from accessing and winding around the axles of the vehicle. One example is land fill compactors (LFCs). Landfills include vast quantities of trash and refuse of varied shape, size, weight and texture. LFCs are used to move the refuse around the landfill for processing, or to evenly distribute the refuse across the landfill prior to being covered with soil. More specifically, as the acreage of a landfill is of a finite quantity, it is beneficial to evenly distribute the refuse to take maximum advantage of the available space. In addition, it is beneficial to break down the refuse into smaller pieces to both facilitate this space usage and lessen the time required for disintegration, biodegradation, dissolution, etc.

While effective, the terrain encountered at a landfill by a LFC is as a result very unpredictable and often sparse or inconsistent in nature. Moreover, as the land fill is being continually added to with new debris typically by dump truck or conveyor, the debris is often initially provided in piles. Over time this can create significant inclines and declines over which the LFC must traverse. To do so, a typical LFC includes four or more wheels having metal rims from which protrude a plurality of spaced and elongated cleats or tips. Such wheels are designed to not only dig deeply into the refuse and provide the traction necessary to navigate, but also chop or otherwise break down the refuse as they rotate.

A particular challenge faced by LFCs is the prevention or abatement of refuse being entrained around the axles of the wheels. This is particularly true of long thin refuse such as wire, cable, or the like that may wrap around the axle or get trapped between the side edge of a wheel and a portion of the wheel-well or chassis of the LFC. Such entrained material may lock the wheel in position potentially crippling operation of the machine, as well as decreasing efficiency and increasing fuel consumption.

In light of the foregoing, certain manufacturers have started to provide structures to limit the ability of such refuse reaching the axle. For example, striker bars can be placed fore and/or aft of the wheel to prevent large pieces of debris from being carried around by the wheel. In addition, a radially extending wall made up of multiple plates may be welded around the entire circumference of the rim at a laterally innermost position. However, the installation of such a wall necessarily adds significant weight to the LFC, and thus may decrease its fuel efficiency. In addition, such walls may require significant time and effort for installation to properly fit around the entire circumference of the wall.

SUMMARY OF THE DISCLOSURE

In accordance with another aspect of the disclosure, a wheel guard for use on a compactor wheel having radially extending tips is disclosed which comprises an arcuate central beam having an upper surface, a lower surface, a first side, a second side, a first end, and a second end; a first flanking leg extending from the arcuate central beam lower surface; and a second flanking leg extending from the arcuate central beam lower surface, the first and second flanking legs extending away from the arcuate central beam in different directions.

In a refinement, a reinforcing material may be provided across at least a central portion of the arcuate central beam upper surface.

In another refinement, the reinforcing material may be provide across approximately one-third of the upper surface.

In another refinement, the arcuate central beam and first and second flanking legs may be formed as one integral piece of material.

In another refinement, the wheel guard may be formed from a first segment and a second segment movable relative to each other.

In another refinement, the first and second segments may both include a recess and a tongue, with the tongue being adapted to slide next to the recess to adjust the length of the wheel guard.

In another refinement, the first and second segments may both include a shoulder defining an end stop to the sliding movement, and thus limit the dimension to which the wheel guard can be shortened.

In another refinement, the wheel guard may include chamfered edges to facilitate welding.

In another refinement, the welding may be performed along the lower surface of the flanking legs and along lower portions of the central beam but not upper portions of the central beam.

In another refinement, the wheel guards may form an inverted "Y" shape in cross-section.

In accordance with one aspect of the disclosure, a compactor wheel is disclosed which comprises a rim having an annularly-shaped circumferential surface, an inner edge and an outer edge; a plurality of refuse engaging tips radially extending from the annularly-shaped circumferential surface; and a plurality of guards secured between circumferentially adjacent tips provided proximate the inner edge of the rim, wherein the plurality of guards and adjacent tips form a continuous barrier around the circumference of the rim, wherein each of the wheel guards includes a central beam and first and second flanking legs.

In accordance with another aspect of the disclosure, a method of manufacturing a compactor wheel is disclosed which comprises providing a rim having an annularly-shaped circumferential surface, the circumferential surface having a laterally inner edge, mounting a plurality of tips to the circumferential surface, each of the plurality of tips extending radially away from the circumferential surface, a subset of the plurality of tips being circumferentially aligned around the rim and being proximate the lateral inner edge of the rim, and securing a wheel guard between circumferentially adjacent tips of the subset, the wheel guards and subset of tips forming a continuous barrier around the circumference of the wheel, the wheel guard including a central section from which first and second flanking legs extend.

In other refinements, one or more of the foregoing aspects and refinements may be combined such that any possible combination of the foregoing is possible and including within the scope of this disclosure.

BRIEF DESCRIPTION OF THE DRAWINGS

FIG. 5 is an enlarged perspective view of a wheel guard constructed in accordance with the present disclosure and installed between adjacent tips of the wheel;

FIG. 6 is a cross-sectional view of the wheel guard of FIG. 5, taken along line 6-6 of FIG. 5;

FIG. 8 is an enlarged perspective view of the two-piece design embodiment of FIG. 7;

FIG. 9 is an enlarged perspective view of the two-piece design of FIG. 8, but depicting the two pieces installed on a larger diameter wheel;

FIG. 10 is an enlarged top perspective view of an alternative embodiment of the two-piece design;

DETAILED DESCRIPTION

Figure 1:
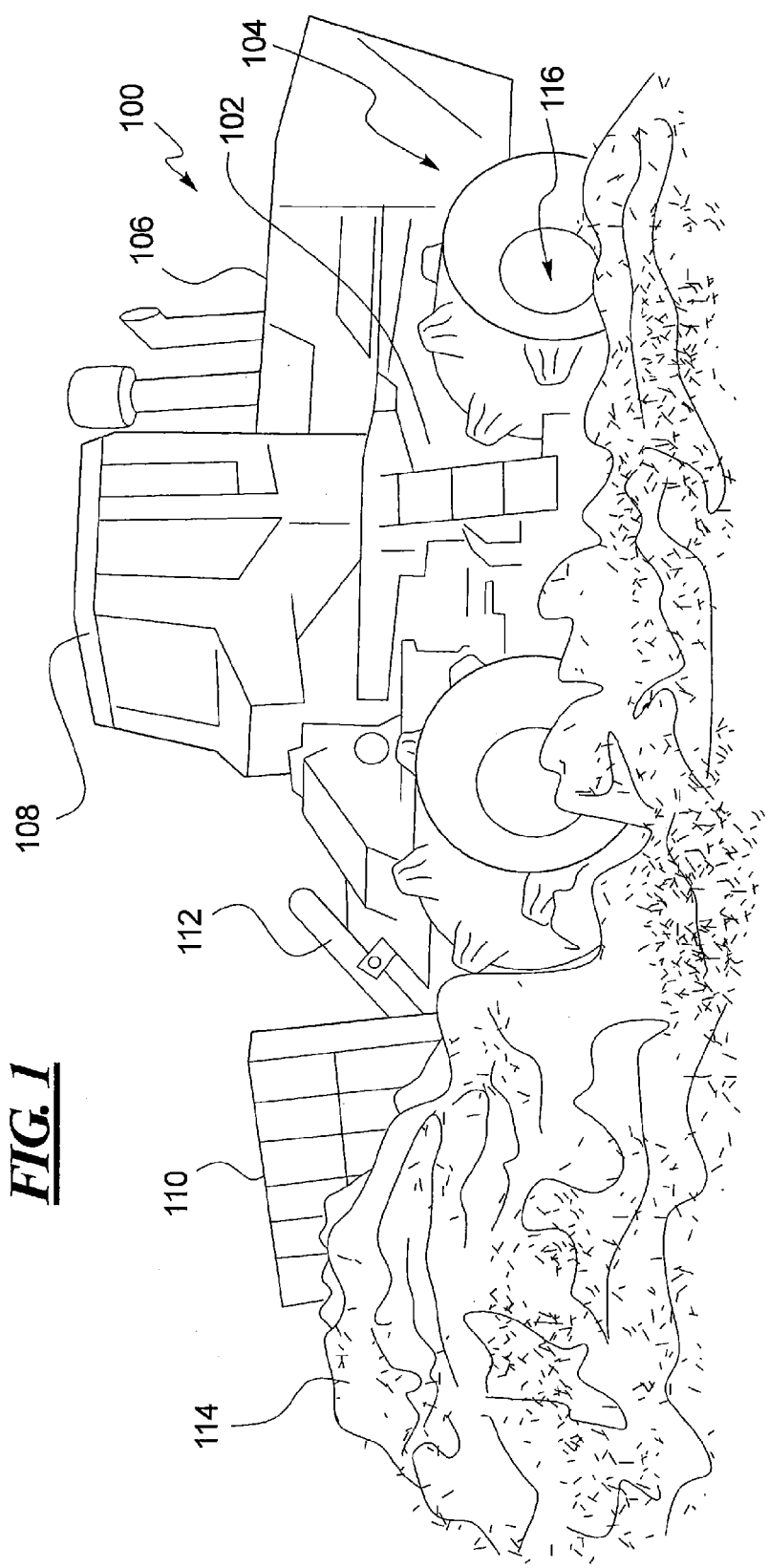
FIG. 1 is a perspective view of a compactor constructed in accordance with the teachings of this disclosure.

Referring now to the drawings, and with specific reference to FIG. 1, a compactor constructed in accordance with the teachings of the disclosure is generally referred to by reference numeral 100. As indicated above, the compactor 100 may be a landfill compactor (LFC) as shown in FIG. 1, but it is to be understood the teachings of the present disclosure can be used in conjunction with other types of compactors as well. The compactor 100 may include a chassis 102 supported by wheels 104. The chassis 102 may support an engine 106 and an operator cab 108. Various implements such as a blade 110 may be mounted on the chassis 102 and be movable by hydraulic cylinders 112 or the like to raise, lower, tilt and turn, and thus manipulate and move debris 114. Each of the wheels 104 may be mounted on an axle 116.

Figure 2:
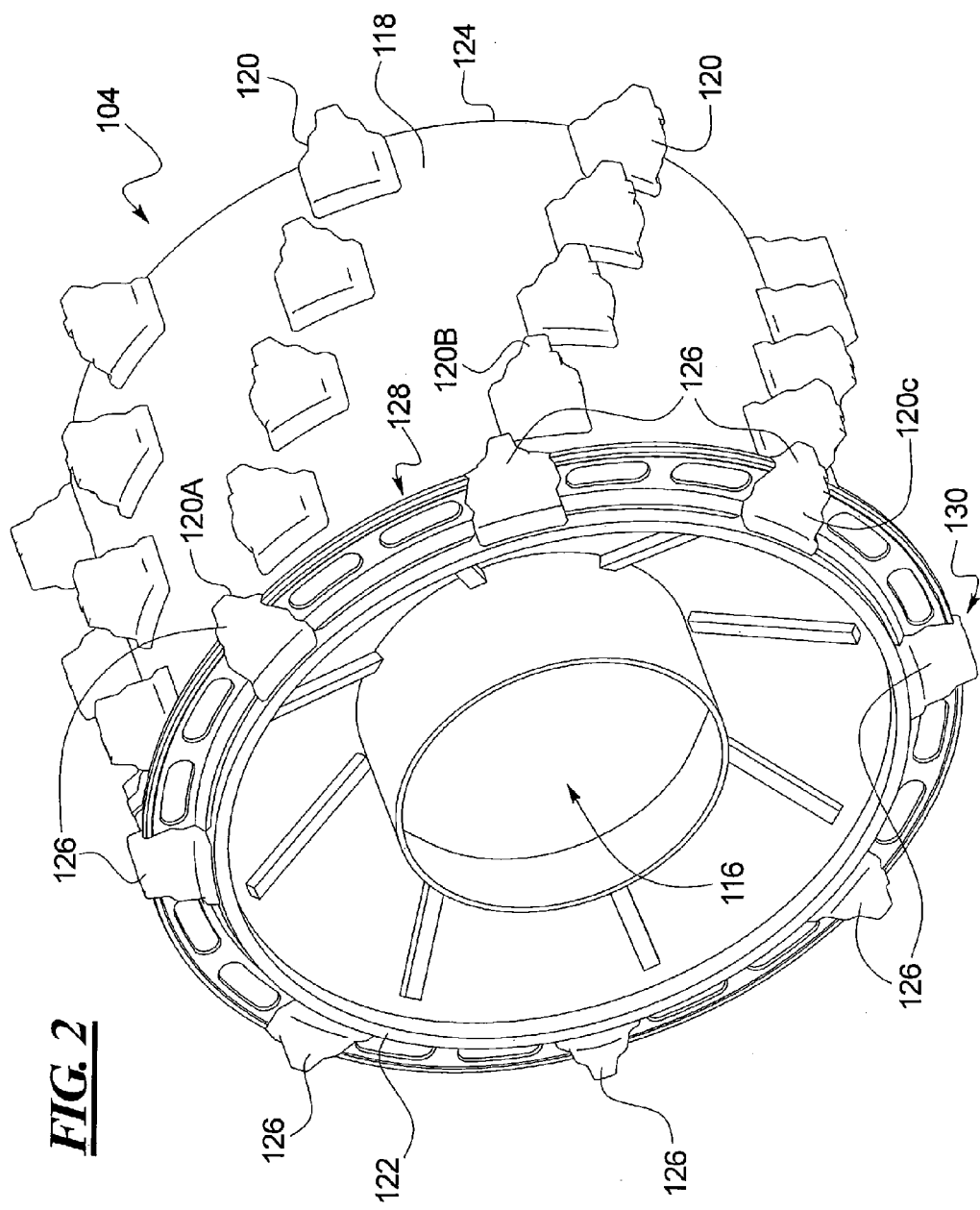
FIG. 2 is a perspective view of another compactor wheel constructed in accordance with the teachings of this disclosure, but employing a different cleat pattern.
Figure 3:
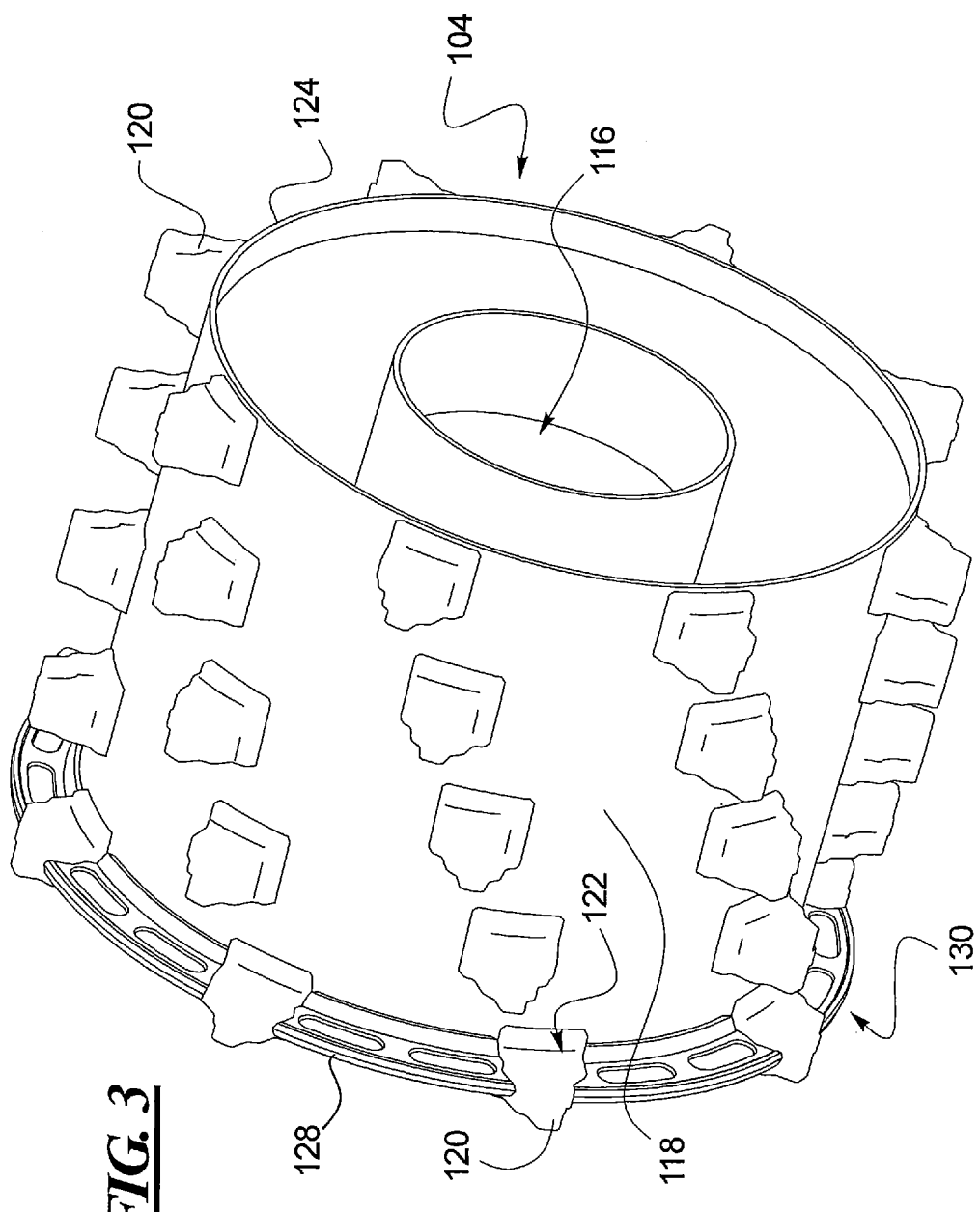
FIG. 3 is an enlarged perspective view of a compactor wheel mounted onto a compactor in accordance with the teachings of this disclosure.

Turning to FIG. 2, each wheel 104 may include an annularly-shaped rim 118 from which radially extend a plurality of cleats or tips 120. As shown, the tips 120 may be provided in a helical pattern laterally across the rim 118 from inner edge 122 to outer edge 124 such as in FIG. 2, an offset pattern such as in FIG. 3, or in any number of different patterns. As it pertains to the present disclosure, it is important to note that with each such pattern, a subset 126 of tips is provided proximate the inner edge 122 of the rim 118.

Between each pair of adjacent tips 120 in the laterally innermost subset 126 is provided a wheel guard 128. For example, in FIG. 2, one pair of adjacent tips is labeled 120a and 120b, and another pair of adjacent tips is labeled 120b and 120c. Although all tips are not labeled in FIG. 2, it is to be understood that an adjacent pair of tips is any circumferentially adjacent pair of the subset 126. By so mounting the wheel guards 128 between adjacent tips 120, a continuous barrier 130 is provided circumferentially around the rim 118. In so doing, the ability of debris 114 to access and wrap around axles 116 is limited.

Figure 4:
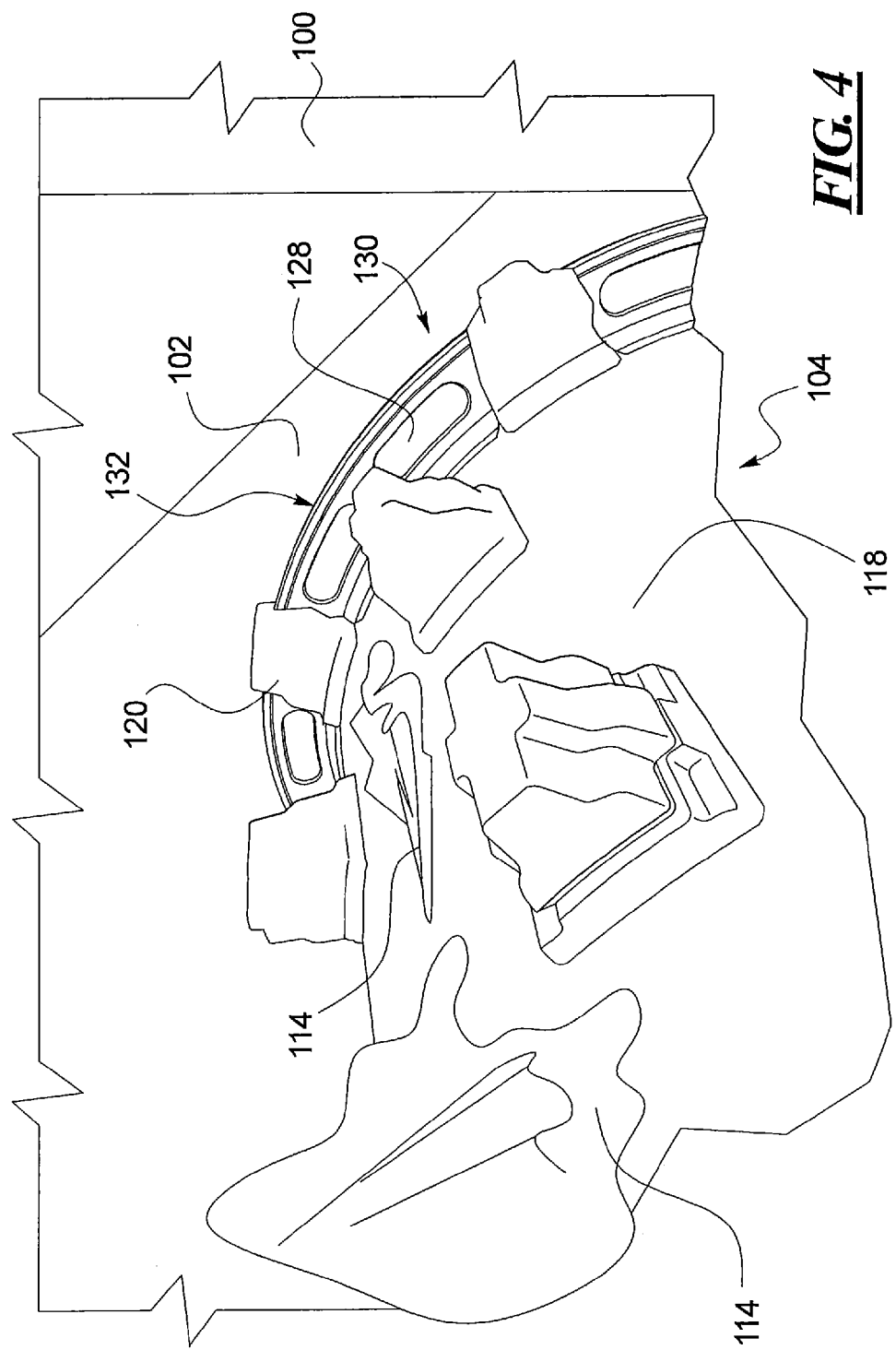
FIG. 4 is a an enlarged perspective view of a portion of a compactor wheel constructed in accordance with the teachings of this disclosure and depicting the positioning of the compactor wheel relative to the chassis of the compactor.

This is perhaps best illustrated in FIG. 4, wherein wheel 104 constructed in accordance with the teachings of this disclosure is mounted to a compactor 100 such that the barrier 130 is provided laterally inward and adjacent the chassis 102. Accordingly, any wire or cable or the like caught up in the tips 120 that is pushed so as to laterally slide across the rim 118, will eventually contact the barrier 130 and be prevented from sliding down into a gap 132 provided between the rim 118 and the chassis 102. Access to and winding around the axles 116 is therefore largely eliminated.

Referring now to FIGS. 5 and 6, more details of the wheel guards 128 are provided. For example, each wheel guard 128 may include an arcuate central beam 134 having an upper surface 136, a lower surface 138, a laterally inner side 140, a laterally outer side 142, a first end 144, and a second end 146. Each wheel guard 128 may further include a laterally inward flanking leg 148 extending from the lower surface 138, and a laterally outward flanking leg 150 extending from the lower surface 138. A net result of such a configuration is that, as shown in FIG. 6, the lateral cross-section of the wheel guard is substantially in the form of an inverted "Y." Among other things, the flanking nature of the legs 148 and 150 provide the wheel guard 128 with significant lateral integrity, the importance of which will be discussed in detail below with respect to the overall side-slope stability of the compactor 100.

It has been discovered through testing of the disclosed wheel guard 128 that in configurations where the wheel guard 128 extends between tips 120, scalloping wear occurs at the middle of the wheel guard 128, which can affect ride and performance of the compactor wheel 104. To counter this scalloping, the upper surface 136 of each wheel guard 128 may be provided with a hardened coating 152 to reinforce the upper surface 136 and thus provide increased wear resistance and serviceable life. For example, the coating may be extruded, welded, plasma flame sprayed, or otherwise coated across the upper surface 136 in a manner known as hard facing. The entire upper surface 136 need not be so hard-faced but rather only a central section 154 thereof may be hard-faced to allow for even wear across the length of the wheel guard 128 for improved ride and performance over the life of the wheel guard 128. In one configuration, the hard facing procedure includes applying melted weld wire directly to the central section 154 during installation of the wheel guard 128. As shown in FIG. 5, the central section 154 may extend across the upper surface 136 from point 155 to point 156. The central section 154 may extend across approximately a third of the overall length of upper surface 136 as shown, or may be as little as one quarter or less of the overall length of the upper surface 136, to up three-quarters or more of the overall length of the upper surface 136.

Each of the laterally inner side 140 and laterally outer side 142 may include weight-reducing recesses 157. While such recesses 157 are depicted as being oval in shape, or course other shapes are possible and within the scope of the present disclosure. The recesses 157, sides 140 and 142, and legs 148 and 150 may all be cast as one unitary piece of metal. The sides 140 and 142 may also include a roughly 1° draft angle relative to perpendicular to facilitate penetration into the debris 114 and removal from the debris 114 with minimal adherence. The common issue of "floating" tips associated with prior art designs is therefore largely avoided by the pending disclosure.

With respect to the first and second ends 144 and 146, FIG. 5 also depicts that each is provided to be complementarily shaped to the sides of the tips 120. More specifically, a lower portion 164 of each end 144 and 146 is canted inwardly so as to mirror the shape of a lower segment 166 of each tip 120, while an upper portion 168 of each end 144 and 146 is shaped to similarly mirror the shape of an upper segment 169 of the tips 120. The upper segment 169 may be integral with or separately formed from the lower segment 166. In one embodiment, the upper segment 169 is separate from the lower segment 166 and formed from a hardened material such as iron with a relatively high carbon content, while the lower segment 166 is made from a more ductile iron with less carbon content. This feature is particularly advantageous when retrofitting existing compactor wheels with pre-existing tips to include such wheel guards 128. As the lower segment 166 of the tip 120 has less carbon content, this facilitates welding to the lower portion 164 of the wheel guard, and dissuades welding between the upper segment 169 and the upper portion 168. In fact the intersection 170 between lower portion 164 and lower segment 166 is one location where each wheel guard 128 is welded to the wheel 104.

Another location where each wheel guard 128 may be welded to the wheel is the annularly shaped outer circumferential surface 172 of the rim 118. More specifically, each side of each wheel guard 128 may be welded from point A to point B in FIG. 5. In addition, each leg 148 and 150 may include a chamfered lower edge 174 where each contacts the annularly shaped outer circumferential surface 172 to thereby provide for weld clearance. In some configurations, the material of the wheel guard 128 may be selected such that welding does not require significant pre-heating. Of course, the specific shape of the ends 144 and 146 need not be as shown, but may be of numerous other shapes and be incorporated within the scope of the present disclosure, as long as the shape substantially mirrors the tip to facilitate the weld and minimize any potential gap between the wheel guard 128 and the tip 120.

Figure 7:
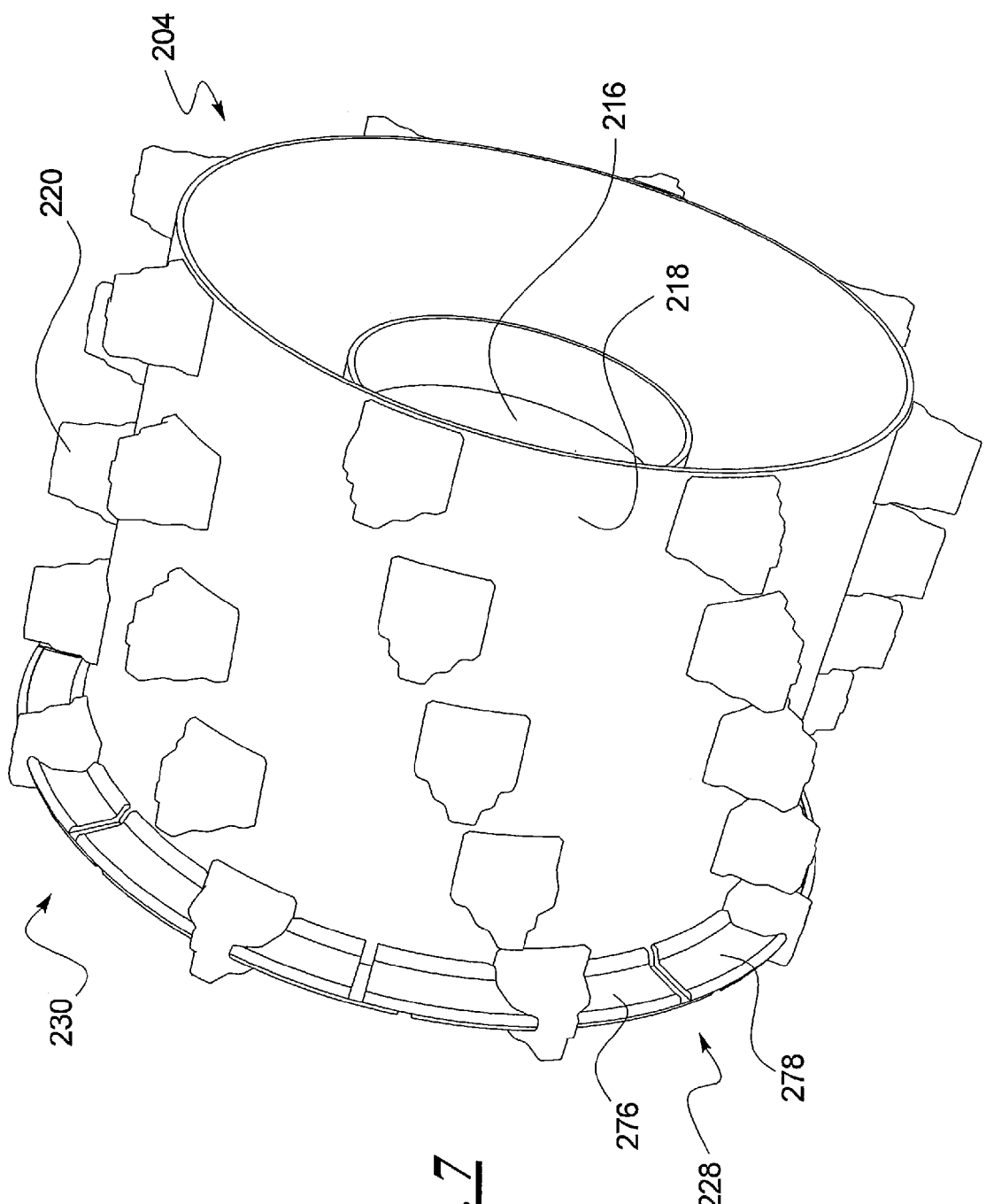
FIG. 7 is a perspective view of another embodiment of a wheel constructed in accordance with the teachings of the disclosure and depicting a two-piece design for each wheel guard.

A second embodiment of the present disclosure is depicted in FIGS. 7-9. As shown therein, the wheel 204, rim 218 and tips 220 are all provided in similar fashion to the first embodiment. However, the wheel guard 228 is provided in two pieces as opposed to the unitary design of the first embodiment. More specifically, the wheel guard 228 of the second embodiment includes a first segment 276 and a second segment 278 which are adjustable relative to one another. This configuration is beneficial in installing a wheel guard 228 onto wheels 204 of varying diameter or where the tips 220 themselves are spaced differently or inconsistently around the circumference of the rim 218. Further, because of the adjustability of this configuration, the wheel guard 228 is able to be adjusted to extend between and abut two tips 220, thus minimizing a gap between the tips 220 and the wheel guard 228. However, while the wheel guards 228 are of adjustable arc length in the second embodiment, the end result is the same in that a barrier 230 is provided at a laterally inward position relative to the chassis to prevent debris from accessing and wrapping around the axles 216 of the compactor 100.

With specific reference to FIGS. 8 and 9, the two piece design is further shown and described. The first and second segments 276, 278 are similar to the unitary design of the first embodiment in that each includes a central arcuate section 234 having an upper surface 236, a lower surface 238, a laterally inward flanking leg 248 and a laterally outward flanking leg 250. Each also includes a laterally inward side 240 and a laterally outer side 242 and a reinforcing coating 252 along the upper surface 236.

Each segment 276, 278 includes a tip engaging end 280 which substantially mirrors the tip 220 to which it is adjacent and does so along the entire length of the tip engaging end. Similar to the first embodiment, the tip engaging end 280 includes a lower portion 264 which is welded to a lower segment 266 of the tip, and an upper portion 268 which is not welded to upper segment 269. As stated above, this may be facilitated by manufacturing the upper segment 269 from a high carbon iron, and the lower segment 268 from a low carbon to facilitate welding.

Each segment also includes a length adjustment end 282 provided in complementary fashion to form an expansion joint 284. More specifically, each length adjustment end 282 may include a recess 286 adapted to receive a tongue 288 of the other segment in sliding fashion. In other words, each length adjustment end 282 is stepped so as to receive the other length adjustment end 282 in complementary fashion.

Each segment may also include a shoulder 290 providing an end stop defining the shortest distance at which the two segments can be configured. Conversely, by sliding the two segments 276, 278 apart as shown in a comparison between FIGS. 8 and 9, the overall length of the wheel guard 228 can be increased to match the distance between the adjacent tips of the inner subset 226. Once so aligned, the segments 276, 278 can then be welded in place similar to the first embodiment. Each segment 276, 278 includes chamfered recesses 274 to facilitate the receipt of the welds. Of course, other configurations enabling the wheel guard 228 to have an adjustable length are possible and incorporated in the scope of the present disclosure, including but not limited to, more than two pieces, an inner tab and outer slot design, a telescoping design, and the like.

The alternative embodiment may also include hard-facing 252 similar to the first embodiment. More specifically, after the two segments 276, 278 are positioned appropriately to space between adjacent tips of the inner subset 226, a vertical welds may be made where the tongues 288 terminate against a respective recess 236. A circumferential weld can also be made from point A to point B, in other words along the entire circumferential surface 272 where the wheel guard 228 meets the rim 218 and along the lower segments 266 of the tips 220 and the lower portions 264 of the ends 280. After being secured to the wheel 204, the upper surface 236 can be hard-faced as by welding, extruding, plasma flame spraying or the like. The entire upper surface 236 need not be hard-faced, and in fact it may be beneficial to avoid scalloping wear in the middle of the upper surface 236 to only hard-face a central section 254. As with the first embodiment, the central section 254 may be only about one third of the overall length of the upper surface 236, but could be as little as one quarter or less, or as much as three-quarters or more.

Figure 11:
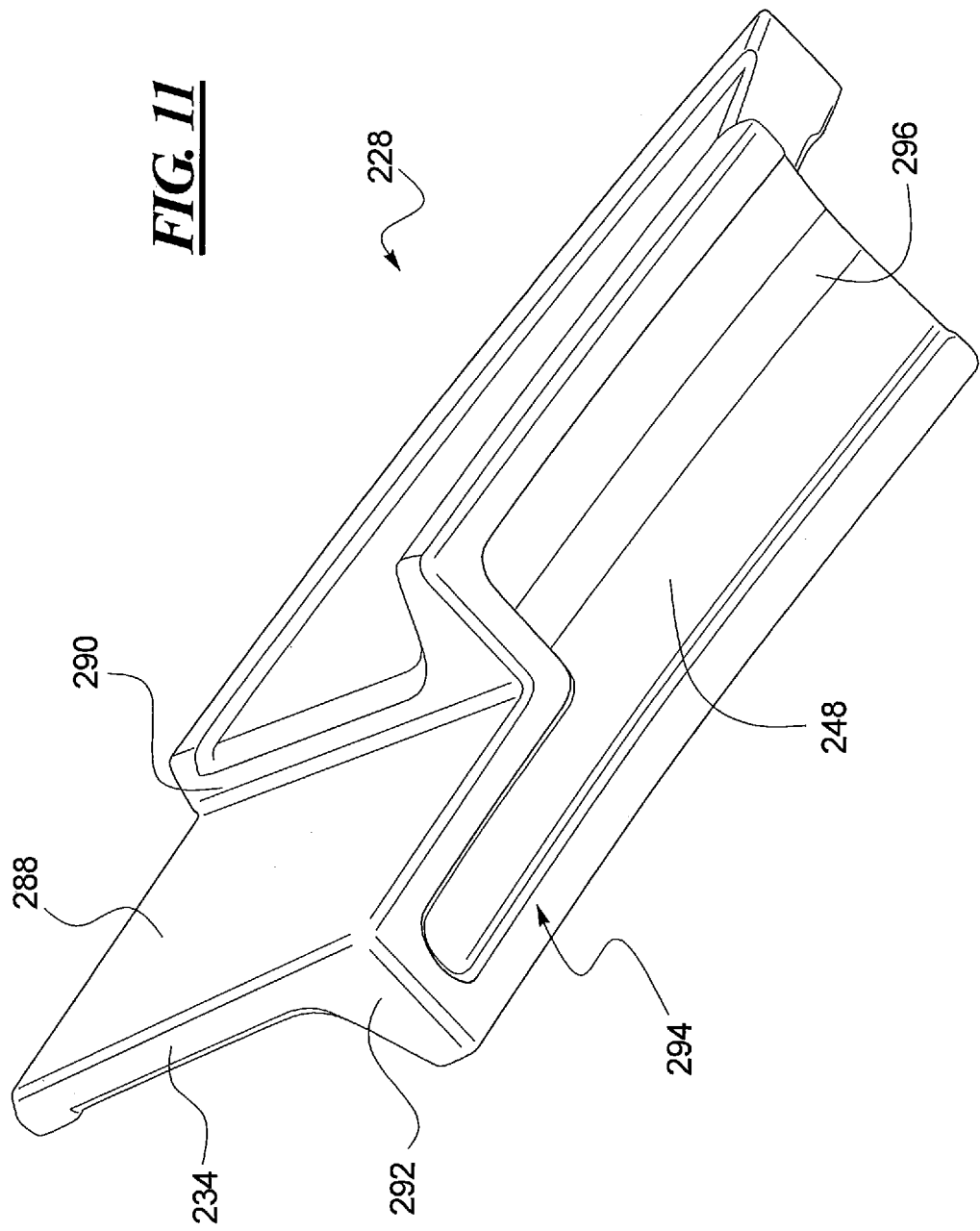
FIG. 11 is a bottom perspective view of one of the pieces of the two-piece design of FIG. 10.

A variation on the second embodiment is depicted in FIGS. 10 and 11. In such a variation, the legs 248 and 250 extend from the central arcuate beam 234 as with the first and second embodiments, but further include an end cap 292 at the terminus of tongue 288. In so doing, wire and other debris may be prevented from accessing any space 294 (see FIG. 8) provided between the legs 248, 250 and the rim 218 and being caught therein. The end cap 292 may be of a thickness only sufficient to close off space 294, thereby providing the wheel guard 228 with a hollow interior 296, as shown in FIG. 9, so as to reduce weight and material costs while avoiding the formation of any open gaps to catch debris.

Figure 12:
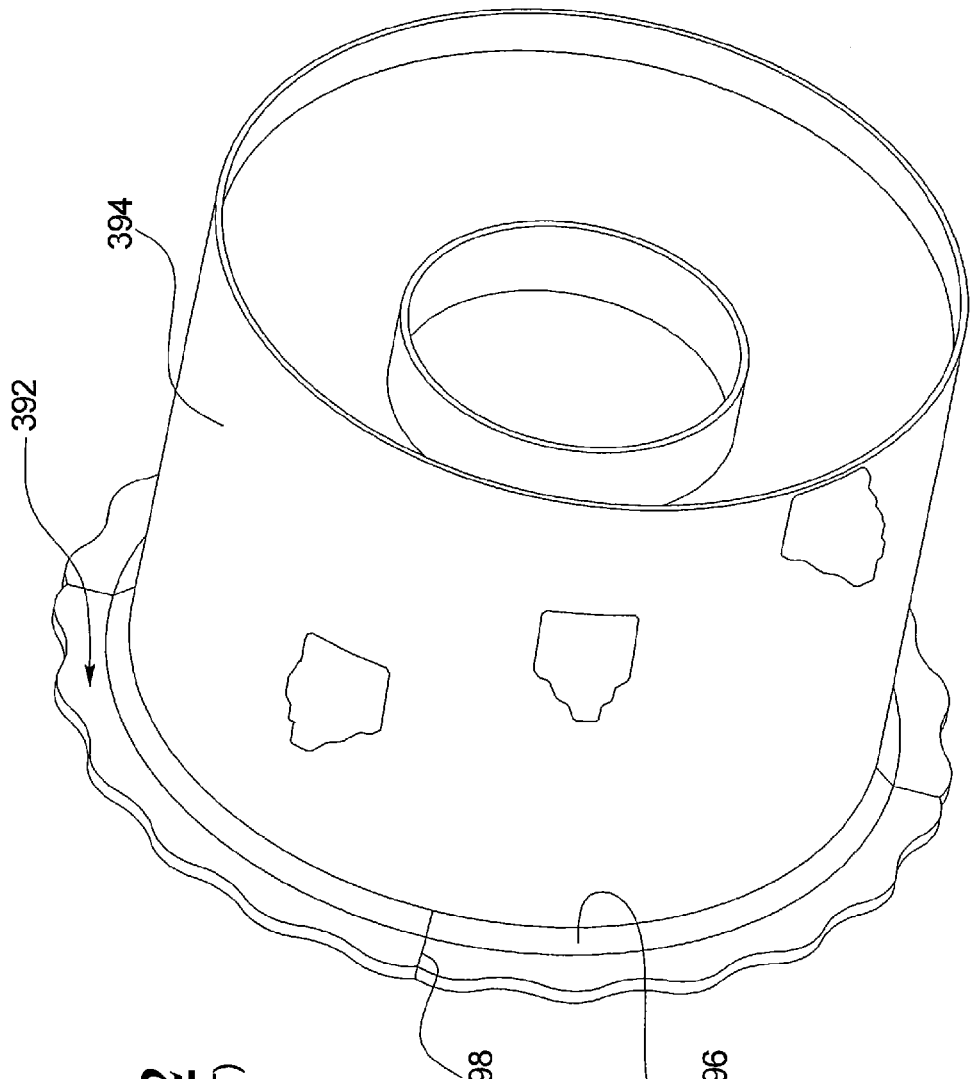
FIG. 12 is a perspective view of a prior art compactor wheel.

Among other things, the present disclosure provides axle protection with much less welding required than prior art designs. This is perhaps best depicted with reference to the prior art wheel of FIG. 12. As shown therein, the prior art design does not take advantage of the existing tips extending from the wheel, but rather creates its wheel guard entirely from additional material. For example, four arcuate wall segments 392 each spanning 90 degrees are aligned to circumscribe the wheel rim 394 and are then welded in place. As the four segments 392 are simply rectangular in lateral cross-section, in order to provide lateral stability, an additional stiffener plate 396 is then also welded in place next to the arcuate segments 392 around the entire circumference of the wheel.

INDUSTRIAL APPLICABILITY

From the foregoing, it can be seen that the technology disclosed herein has industrial applicability in a variety of settings such as, but not limited to, use on landfill compactor wheels to prevent or substantially reduce debris from accessing and winding around the axles of the compactor. Moreover, as will be described in greater detail below, it does so with much less material and thus weight than prior art designs, with less welding required, greater side slope stability, greater traction and speed, and reduced manufacturing and maintenance costs.

Quantifying the prior art design in terms of both weight and welding required relative to the pending disclosure is telling. For this purpose, data from comparably diametered wheels of a prior art design and the present disclosure is summarized below. For example, with the prior art wheel of FIG. 12, four (4) ninety degree wall segments are required, each having a weight of 50.94 kg, for a subtotal weight of 203.74 kg. In addition, six (6) stiffener plates are required each having a weight of 5.92 kg, for a subtotal weight of 35.52 kg. In total, this sums to a weight of 239.26 kg.

With the present disclosure on the other hand, eight (8) wheel guards are used each having a weight of 15.46 kg, and a subtotal weight of 123.68 kg. While no stiffener plates are required with the present disclosure, additional tips may be required. For example, in the depicted embodiment, four (4) additional tips may be required in addition to the tips of the subset, each having a weight of 19.66 kg, for a subtotal weight of 78.64 kg. In total, this sums to a weight of 202.32 kg.

Comparing the two, it can be seen the present disclosure affords a 15.4% reduction in weight, i.e., 202.32 kg vs. 239.26 kg. Not only does this therefore result in lower initial manufacturing costs in terms of materials, but it also results in increased efficiency in terms of fuel consumption and thus lower operating costs as well in that the engine need not move as much weight.

The design of the present disclosure also lends itself to substantially reduced welding requirements as well. As opposed to the prior art design that requires circumferential welds along each of the wall segments, along each of the stiffener plates, and along each of the vertical seams where the wall segments and stiffener plates abut, the present disclosure only calls for welds along the lower surfaces of each of the wheel guard legs, and along lower portions of the wheel guard ends where they contact the tips.

Again, this savings is striking when quantified. First with respect to the prior art design of FIG. 12, it requires four (4) circumferential welds each of 5404 mm in length for a subtotal of 21,616 mm. In addition, it requires eight (8) vertical welds (where the segments abut) each of 118 mm in length, for a subtotal of 944 mm. In total, this sums to 22,560 mm of weld.

In contrast, the pending disclosure only requires circumferential welds from point A to point B in FIG. 5 of 519 mm. This is for each leg of each wheel guard for a subtotal of 1038 mm of weld for each wheel guard. As eight (8) wheel guards are used in the depicted embodiment, this equates to a total of only 8304 mm of weld. Comparing this to the prior art design, this is a net reduction in weld length of 63.2%, i.e., 22,560 mm vs. 8304 mm. Again, this translates to substantial material and labor cost savings to the original equipment manufacturer or retrofitting entity.

The present disclosure also provides for drastically improved slide-slope stability over compactor wheels without wheel guards. More specifically, the additional surface area provided by the wheel guards improves the ability of the compactor to maintain its position when posited laterally across an incline. Taking the depicted embodiment as an example, each wheel guard has addition surface area of 68,039.6 mm$^2$. This is based on a typical wheel guard having a height above the rim of about six inches (152.4 mm), and a tip height of about seven inches (177.8 mm). As there are eight (8) such segments in the depicted embodiment this equates to a total additional surface area of 544,316.8 mm$^2$. As prior art designs without wheel guards only have the surface area afforded by the tips extending from the wheel rim, this translates to an increase in slide-slope stability of roughly 23%.

The present disclosure also provides for increased traction by providing a draft angle of 1% or less to enable the wheel guard to penetrate the debris in a knifing action; reduces floating (penetrates into the debris and does not allow the wheel to float above the debris, while at the same time pushing debris down and not pulling the debris onto the wheel); increases wearability and serviceable life through the use of hard facing and flanking leg configuration; and improves compaction and destruction of debris. Given the ease with which the wheel guards can be installed, their use also lends themselves to being manufactured as part of the original wheel or being retrofitted to the many compactor wheels already in service. The latter point is a significant advantage over prior art designs that require considerable rework to the existing compactor wheel during any retrofit procedure.

From the foregoing, it can be seen that the present disclosure sets forth a compactor wheel and wheel guard, as well as a method of manufacturing same which greatly lessens the likelihood of debris from accessing and wrapping around the axles of the compactor, while at the same time improves efficiency, lessens costs, and improves performance.

What is claimed is:

1. A wheel guard for use on a compactor wheel having radially extending tips, comprising:
   an arcuate central beam having an upper surface, a lower surface, a first side, a second side, a first end, and a second end, the first and second ends having at least portions of which are complementarily shaped with respect to the radially extending tips;
   a first flanking leg extending from the arcuate central beam lower surface; and
   a second flanking leg extending from the arcuate central beam lower surface, the first and second flanking legs extending away from the arcuate central beam in different directions.

2. The wheel guard of claim 1, further including a reinforcing material provided across at least a central portion of the arcuate central beam upper surface.

3. The wheel guard of claim 2, wherein the reinforcing material is provided across approximately one-third of the arcuate central beam upper surface.

4. The wheel guard of claim 1, wherein the arcuate central beam, first flanking leg and second flanking leg are formed as one, integral piece of material.

5. The wheel guard of claim 4, wherein the wheel guard is formed from a first segment and a second segment movable relative to each other.

6. The wheel guard of claim 5, wherein the first segment and second segment both include a recess and a tongue, the tongue of each segment being adapted to slide next to the recess of the other segment to adjust the length of the wheel guard.

7. The wheel guard of claim 6, wherein the first segment and second segment both include a shoulder defining an end stop to sliding movement and thus limit the dimension to which the wheel guard can be shortened.

8. The wheel guard of claim 5, wherein the wheel guard further includes end caps extending between the flanking legs and the arcuate central beam.

9. A compactor wheel, comprising:
   a rim having an annularly-shaped circumferential surface, an inner edge, and an outer edge;
   a plurality of tips radially extending from the annularly-shaped circumferential surface; and
   a plurality of wheel guards secured between circumferentially adjacent tips provided proximate the inner edge of the rim, the plurality of wheel guards and adjacent tips forming a barrier around the circumference of the rim, each of the wheel guards including a central beam, a first flanking leg and a second flanking leg.

10. The compactor wheel of claim 9, wherein each of the plurality of wheel guards includes two segments which are movable relative to each other prior to being permanently fixed in place.

11. The compactor wheel of claim 9, wherein each of the plurality of wheel guards includes hard facing only on a central section of each wheel guard.

12. The compactor wheel of claim 11, wherein the hard facing is applied over a range of approximately one-third to approximately two-thirds of the upper surface.

13. The compactor wheel of claim 9, wherein each of the wheel guards has a tip engaging end substantially mirroring the tip to which it is adjacent and does so along the entire length of the tip engaging end, but wherein the tip engaging end is only welded to the tip along a lower segment of the tip.

14. The compactor wheel of claim 9, wherein each of the wheel guards includes a substantially inverted "Y" shape in lateral cross-section.

15. The compactor wheel of claim 10, wherein the wheel guard further includes an end cap extending between the central beam and flanking legs proximate the rim.

16. A method of manufacturing a compactor wheel, comprising:
   providing a rim having an annularly-shaped circumferential surface, the circumferential surface having a laterally inner edge;
   mounting a plurality of tips to the circumferential surface, each of the plurality of tips extending radially away from the circumferential surface, a subset of the plurality of tips being circumferentially aligned around the rim and being proximate the lateral inner edge of the rim; and
   securing a wheel guard between circumferentially adjacent tips of the subset, the wheel guards and subset of tips forming a barrier around the circumference of the wheel, the wheel guard including a central section from which first and second flanking legs extend.

17. The method of claim 16 wherein each wheel guard includes an arcuate bottom surface and first and second ends, and wherein the wheel guards are secured by welding along the arcuate bottom surface and lower portions of the first and second ends, leaving a intersection between upper portions of the first and second ends and upper segments of the tips which are not welded.

18. The method of claim 16, further including adjusting the length of the wheel guards prior to securing the wheel guards.

19. The method of claim 18, wherein the adjusting is performed by sliding first and second segments of the wheel guards relative to each other along an expansion joint.

20. The method of claim 16 further including applying a hardened coating to a portion of an upper surface of each wheel guard.

* * * * *